US011914339B2

(12) United States Patent
Li et al.

(10) Patent No.: US 11,914,339 B2
(45) Date of Patent: Feb. 27, 2024

(54) DATUM SELECTION METHODS AND SYSTEMS FOR MINIMIZING HOLE POSITION ERRORS IN GROUP HOLE MACHINING OF LARGE COMPONENTS

(71) Applicant: CHENGDU AIRCRAFT INDUSTRIAL (GROUP) CO., LTD., Sichuan (CN)

(72) Inventors: Jie Li, Chengdu (CN); Dawei Liu, Chengdu (CN); Zhenbo Ma, Chengdu (CN); Yuanji Liu, Chengdu (CN); Jiangyang Gou, Chengdu (CN); Ying Xie, Chengdu (CN); Chaolin Shuai, Chengdu (CN); Xuemei Chen, Chengdu (CN); Dawei Lu, Chengdu (CN); Qingliang Chen, Chengdu (CN)

(73) Assignee: CHENGDU AIRCRAFT INDUSTRIAL (GROUP) CO., LTD., Chengdu (CN)

( * ) Notice: Subject to any disclaimer, the term of this patent is extended or adjusted under 35 U.S.C. 154(b) by 0 days.

(21) Appl. No.: 18/447,291

(22) Filed: Aug. 9, 2023

(65) Prior Publication Data
US 2023/0384755 A1    Nov. 30, 2023

Related U.S. Application Data

(63) Continuation-in-part of application No. PCT/CN2021/136932, filed on Dec. 10, 2021.

(30) Foreign Application Priority Data

Feb. 9, 2021    (CN) ......................... 202110177385.9

(51) Int. Cl.
G05B 19/402    (2006.01)

(52) U.S. Cl.
CPC .. G05B 19/402 (2013.01); *G05B 2219/36201* (2013.01)

(58) Field of Classification Search
CPC ................. G05B 19/402; G05B 15/02; G05B 2219/36201
(Continued)

(56) References Cited

U.S. PATENT DOCUMENTS 6,480,757 B1 * 11/2002 Susnjara .............. G05B 19/401
                                                    702/158
9,598,183 B1 *  3/2017 Kalisz ....................... B64F 5/40
(Continued)

FOREIGN PATENT DOCUMENTS

CN        1221500 A  *  6/1999  ............ B25J 9/1692
CN      102266958 A     12/2011
(Continued)

OTHER PUBLICATIONS

International Search Report in PCT/CN2021/136932 dated Mar. 1, 2022, 7 pages.
(Continued)

*Primary Examiner* — Ronald D Hartman, Jr.
(74) *Attorney, Agent, or Firm* — Porus IP LLC

(57) ABSTRACT

Embodiments of the present disclosure provide a datum selection method for minimizing hole position errors in group hole machining of large components, comprising: 1) determining a type of a computer numerical control (CNC) machine tool and establishing a topological structure of the CNC machine tool; 2) establishing a theoretical postural model of a tool center point during a motion; 3) establishing a hole position error model; 4) establishing an average error model of hole positions in group hole machining; and 5) obtaining a machining datum for group holes of corresponding components. For the skeleton and skinned group hole (Continued)

machining of aircraft components, different principles of datum selection are provided respectively, which can effectively improve the positional accuracy of the skeleton or skinned group hole machining, at the same time provides a more scientific and reasonable approach for the datum selection in group hole machining of large components.

10 Claims, 8 Drawing Sheets

(58) Field of Classification Search
USPC .......................................................... 700/114
See application file for complete search history.

(56) References Cited

U.S. PATENT DOCUMENTS

| | | | |
|---|---|---|---|
| 11,609,550 B2* | 3/2023 | Bond ....................... | B23B 49/00 |
| 2008/0114485 A1* | 5/2008 | Katoh ................... | G05B 19/404 |
| | | | 700/193 |
| 2010/0111630 A1* | 5/2010 | Yamagishi ............. | B23Q 17/24 |
| | | | 409/131 |
| 2011/0178782 A1 | 7/2011 | Yang et al. | |
| 2011/0295408 A1* | 12/2011 | Burgel ................. | G05B 19/401 |
| | | | 700/192 |
| 2017/0220021 A1* | 8/2017 | Bode ........................ | B64F 5/10 |
| 2022/0317658 A1* | 10/2022 | Bond ....................... | B23B 49/00 |

FOREIGN PATENT DOCUMENTS

| | | | | |
|---|---|---|---|---|
| CN | 102636110 A | | 8/2012 | |
| CN | 103279604 A | * | 9/2013 | |
| CN | 103279604 A | | 9/2013 | |
| CN | 105867309 A | | 8/2016 | |
| CN | 112033331 A | | 12/2020 | |
| CN | 112558549 A | | 3/2021 | |
| CN | 115453977 A | * | 12/2022 | |
| CN | 115673382 A | * | 2/2023 | |
| GB | 2579762 A | * | 7/2020 | ............. B21J 15/02 |
| JP | 2003251508 A | * | 9/2003 | ............... E03C 1/22 |
| JP | 2014128867 A | * | 7/2014 | ............. B23Q 15/24 |

OTHER PUBLICATIONS

Written Opinion in PCT/CN2021/136932 dated Mar. 1, 2022, 9 pages.
Bing, Feng et al., Research on PMAC-Based Control System for Flexible Track Drilling Machine, Aeronautical Manufacturing Technology, 2013, 6 pages.
First Office Action in Chinese Application No. 202110177385.9 dated May 12, 2021, 10 pages.
Decision to Grant a Patent in Chinese Application No. 202110177385.9 dated Jun. 2, 2021, 6 pages.

* cited by examiner

DATUM SELECTION METHODS AND SYSTEMS FOR MINIMIZING HOLE POSITION ERRORS IN GROUP HOLE MACHINING OF LARGE COMPONENTS

CROSS REFERENCE TO RELATED APPLICATIONS

The present disclosure is a continuation-in-part of International Patent Application No. PCT/CN2021/136932, filed on Dec. 10, 2021, which claims priority to Chinese Patent Application No. 202110177385.9, filed on Feb. 9, 2021, the entire contents of which are hereby incorporated by reference.

TECHNICAL FIELD

The present disclosure relates to the field of mechanical processing technology, and in particular, to a datum selection method and system for minimizing hole position errors in group hole machining of large components.

BACKGROUND

In the aircraft assembly process, mechanical connections are primarily used for the assembly of structural components. The machining quality of connection holes has a significant impact on enhancing connection accuracy, aircraft performance, and service life. Although traditional manual drilling methods, when combined with certain targeted measures, can improve the machining quality and efficiency of connection holes to some extent, they fail to meet the requirements of assembly quality and efficiency. Consequently, the application of multi-axis computer numerical control (CNC) machine tools in the field of aircraft assembly and manufacturing is increasingly prevalent, in order to enhance the quality and efficiency of aircraft assembly.

During the assembly process of large components, there are numerous tasks involving skeleton group hole and skinned group hole machining. Currently, common methods for selecting a machining datum for product manufacturing include: 1) using an origin point of the CNC machine as the datum; and 2) using a starting point on the product as the datum. The positional accuracy of group hole machining is primarily influenced by the positional accuracy of the tool center point of the manufacturing equipment. This accuracy is determined by the positioning capability of the machine tool's rotational and translational axes. During the installation and calibration of multi-axis CNC machine tools, geometric errors, positioning errors, and assembly errors may arise. Moreover, factors such as positioning accuracy and straightness are closely related to the length of motion, with longer motion resulting in larger errors. In the CNC machining process, the motion of each axis is referenced to the selected datum, followed by relative motion. Thus, the choice of process datum directly impacts the motion range of the axes, ultimately affecting the machining accuracy of the multi-axis CNC machine tools. Given the high machining quality requirements and the relatively large size of the component contours, the machining tasks for group holes in large components are particularly demanding.

SUMMARY

One or more embodiments of the present disclosure provide a datum selection method for minimizing hole position errors in group hole machining of large components, which can effectively improve the positional accuracy of a skeleton group hole machining and a skinned group hole machining, and more reasonably select a datum in group hole machining of large components. The method is executed by a processor, including:

(1) determining a type of a computer numerical control (CNC) machine tool from IoT (Internet of Things) sensing data obtained by an IoT unit, establishing a topological structure of the CNC machine tool with respect to a motion unit of the CNC machine tool, and storing the topological structure in a storage unit.

(2) obtaining the topological structure established in step (1) from the storage unit, establishing a theoretical postural model of a tool center point during a motion of the motion unit, and storing the theoretical postural model of the tool center point in the storage unit.

(3) obtaining the theoretical postural model of the tool center point established in step (2) from the storage unit, establishing a hole position error model based on a distance between an actual position of the tool center point and a theoretical position corresponding to the theoretical postural model of the tool center point during a hole making process and by means of a projection relation of a plane perpendicular to an ideal axis, and storing the hole position error model in the storage unit.

(4) establishing an average error model of hole positions in group hole machining of corresponding components according to a datum selected from the group hole machining of the components and in conjunction with the hole position error model obtained in step (3) from the storage unit, and storing the average error model in the storage unit.

(5) obtaining the average error model obtained in step (4) from the storage unit, applying a partial derivation to variables of the average error model, and obtaining a machining datum of group holes of the corresponding components.

In some embodiments of the present disclosure, in step (1), the establishing a topological structure of the CNC machine tool with respect to a motion unit of the CNC machine tool includes: simplifying the topological structure of the CNC machine tool according to a low order body array manner and numbering the motion unit with a low order body.

In some embodiments of the present disclosure, in step (1), the type of the CNC machine tool includes a five-axis CNC machine tool of an AC pendulum angle type, and the five-axis CNC machine tool includes a machine tool bed, an X-axis motion unit, a Y-axis motion unit, a Z-axis motion unit, a C-axis motion unit, and an A-axis motion unit.

The topological structure of the CNC machine tool is as follows: the machine tool bed→the X-axis motion unit→the Y-axis motion unit→the Z-axis motion unit→the C-axis motion unit→the A-axis motion unit, wherein the C-axis motion unit is pivotally connected to the Z-axis motion unit, the A-axis motion unit is pivotally connected to the C-axis motion unit, a machining spindle is solidly connected to the A-axis, and a tool is placed to be clamped on the machining spindle.

In some embodiments of the present disclosure, in step (2), the theoretical postural model of a tool center point during a motion is established based on a multi-body system theory and a postural error and a geometrical error of each motion axis. In some embodiments of the present disclosure, wherein the establishing a hole position error model in step (3) includes: constructing the hole position error model based on the distance between the actual position and a theoretical position of the tool center point during the hole making process and through the projection relation of the plane perpendicular to the ideal axis.

In some embodiments of the present disclosure, in step (4), the establishing an average error model of hole positions in group hole machining includes:
- (4.1) determining a machining form of the group holes of the components;
- (4.2) selecting a corresponding datum according to the determined machining form of the group holes of the components;
- (4.3) establishing the average error model based on the selected datum and the hole position error model during the hole making process.

In some embodiments of the present disclosure, in step (4.1), the machining form of the group holes of the components includes a skeleton group hole machining form and a skinned group hole machining form.

In some embodiments of the present disclosure, in step (4.2), the selecting a corresponding datum includes: selecting an origin coordinate value upwardly of a group hole machining product;
- wherein a principle of selecting a skeleton group hole machining datum includes: selecting an origin coordinate value for skeleton group hole machining within a range in a direction of the group hole machining product;
- a principle of selecting a skinned group hole machining datum includes: determining an origin coordinate value for skinned group hole machining through a maximum value of the direction of the group hole machining product and a safety distance reserved between the tool center point and the skin.

In some embodiments of the present disclosure, in step (5), the group holes of the corresponding components are skeleton group holes, and the obtaining a machining datum of group holes of the corresponding components includes: obtaining a datum for minimizing a hole position error in skeleton group hole machining by establishing a Lagrangian function and obtaining a partial derivation of variables of the Lagrangian function.

In some embodiments of the present disclosure, the group holes of the corresponding components are skinned group holes, and the obtaining a machining datum of group holes of the corresponding components includes: obtaining a datum for minimizing a hole position error in skinned group hole machining by applying a bias derivation to variables of an average error model of hole positions in the skinned group hole machining.

Some embodiments of the present disclosure are exemplified by a five-axis CNC machine tool of an AC pendulum angle type, which consists of following parts: a machine tool bed, an X-axis motion unit, a Y-axis motion unit, a Z-axis motion unit, a C-axis motion unit, and an A-axis motion unit, wherein a negative direction of the Z-axis motion unit serves as a direction for product machining. The topological structure of the machine is simplified according to a low order body array manner and a corresponding motion unit is numbered with a low order body.

In some embodiments, the processor establishes the theoretical postural model of the tool center point during the motion of the motion unit through a multi-body system theory and a positional and geometric error of each motion axis. According to a multi-body kinematics theory, a motion state of any rigid body in space may be expressed by a transformation relationship of a homogeneous coordinate matrix in a corresponding direction, in which the machine tool linear feed axis U and rotation feed axis V indicate that the error is a static error. X, Y, and Z indicate a direction of a linear error, $\alpha$, $\beta$, and $\gamma$ denote a direction of a rotation error around the X, Y, and Z respectively. u denotes a displacement amount of the linear feed axis U, and v denotes a rotation amount of the rotation feed axis V. i and j denote a low order body number of a corresponding feed axis in the topological structure of the machine tool and a current feed axis number respectively, and an error transfer matrix corresponding to the linear feed axis U and the rotation feed axis V may be expressed as respectively:

$$E_{Ui}^j(u)=\delta X_i^j(u)\delta Y_i^j(u)\delta Z_i^j(u)\delta\alpha_i^j(u)\delta\beta_i^j(u)\delta\gamma_i^j(u), \text{ and}$$

$$E_{Vi}^j(v)=\delta X_i^j(v)\delta Y_i^j(v)\delta Z_i^j(v)\delta\alpha_i^j(v)\delta\beta_i^j(v)\delta\gamma_i^j(v).$$

Assuming that a distance between a tool center point on a spindle end face and a wrist center (where the wrist center is an intersection of a rotation axis of the A-axis and a rotation axis of the C-axis) is a sum of a rotation center distance and a length of the tool, expressed as l, a motion amount of each feed axis is set to be x, y, z, c, and a respectively. A motion trajectory $P_{ideal}$ of the five-axis CNC machine tool in an ideal state is expressed as:

$$P_{ideal}=M_0^1(x)M_1^2(y)M_2^3(z)M_3^4(c)M_4^5(a)P_l.$$

Ideally, an attitude $V_{ideal}$ of a pendulum angle of the five-axis CNC machine tool is expressed as:

$$V_{ideal}=M_0^1(x)M_1^2(y)M_2^3(z)M_3^4(c)M_4^5(a)V_l.$$

In an actual working situation, during a five-axis CNC machine tool group hole machining, the motion trajectory is expressed by the form of points, so the feed axis motion of the machine tool may be seen as only affected by the static error, the actual trajectory of the tool center point is a combined result of an ideal motion of the machine tool and the error. A final equation for the trajectory $P_{actual}$ of the tool center point in an actual situation may be obtained as:

$$P_{actual}=M_0^1(x)E_0^1(x)M_1^2(y)E_1^2(y)M_2^3(z)E_2^3(z)M_3^4(c)\\E_4^3(c)M_4^5(a)E_4^5(a)P_l.$$

A hole position error model is established by a distance between an actual and theoretical position of the tool center point $P_{error}$:

$$P_{error}=P_{actual}-P_{ideal}=[P_{error\_x}P_{error\_y}P_{error\_z}0]^T.$$

Based on a projection of a position error during the hole making process on a plane perpendicular to an ideal axis, a calculation expression for a position deviation $P_{error\_V}$ at a hole making position may be calculated as:

$$P_{error\_V}=(I_4-V_{ideal}V_{ideal}^T)P_{error},$$

where the unit matrix $$I_4 = \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

denotes a unit matrix of 4×4.

And a hole position error $R_E$ when making a hole on this machine tool is obtained as:

$$R_E=|P_{error\_V}|.$$

There are usually two forms in group hole machining of large components, i.e., skeleton group hole machining and skinned group hole machining. Depending on the machining type, the way for selecting the datum may be different. Usually, during the skeleton group hole machining, an open area of the skeleton is large, and a machining position of group holes along a direction of the Z-axis may be different, i.e., the group holes are not necessarily in a same Z-plane. Therefore, the datum for the skeleton group hole machining may be selected in a middle open area of the skeleton, and finally, an optimal datum position in the machining process is obtained through a datum selection model in skeleton group hole machining.

A position coordinate of the group holes $(X_{k1}, Y_{k1}, Z_{k1})$ is:

$(X_{k1}, Y_{k1}, Z_{k1}), k1=0,1, \ldots, n-1, (n \geq 3)$.

where k1 denotes a natural number and n denotes a positive integer, then an expression for an average error $P_{error\_Ek1}$ generated during the skeleton group hole machining is as follows:

$$P_{error\_Ek1}(X'_1, Y'_1, Z'_1) = \frac{\sum_{k=0}^{n-1} R_{Ek1}}{n}$$

(where $R_{Ek1}$ denotes a hole position error of a single hole)

At the same time, according to a value range of coordinates $Z'_1$ of the skeleton group hole machining, it may set:

$Z'_1 = r$, wherein $Z_{k1min} \leq r \leq Z_{k1max}, k1=0,1, \ldots, n-1, (n \geq 3)$.

A Lagrangian function is set as:

$(X'_1, Y'_1, Z'_1, \lambda) = P_{error\_Ek1}(X'_1, Y'_1, Z'_1) + \lambda(Z'_1 - r)$.

A minimum value of $L(X'_1, Y'_1, Z'_1, \lambda)$ is obtained and designated as an optimal coordinate $(X'_{1min}, Y'_{1min}, Z'_{1min})$ in the skeleton group hole machining.

A principle of selecting a Z coordinate in datum selection in skinned group hole machining is as follows: determining the coordinate in the Z direction in the skinned group hole machining through a maximum value of the group holes in the Z direction and a safety distance reserved between the tool center point and the skin.

A maximum value of $Z_{k2}$ is selected based on the skinned group hole machining position $(X_{k2}, Y_{k2}, Z_{k2})$, k2=0, 1, ..., n-1, (n≥3), that is, $Z_{k2max}=MAX(Z_{k2})$, i=0, 1, ..., n-1, (n≤3).

where k2 denotes a natural number, n denotes a positive integer, and H is the safety distance between the skin and the tool center point, that is, the coordinate $Z_2'$ of the tool center point selected by the datum in the skinned group hole machining is:

$Z'_2 = Z_{k2max} - H$.

An expression for an average error generated during the skinned group hole machining is as follows:

$$P_{error\_Ek2}(X'_2, Y'_2, Z'_2) = \frac{\sum_{k2=0}^{n-1} R_{Ek2}}{n}$$

(where $R_{Ek2}$ denotes a hole position error of a single hole), a minimum value of $P_{error\_Ek2}(X'_2, Y'_2, Z'_2)$ is obtained and designated as an optimal datum coordinate $(X'_{2min}, Y'_{2min}, Z'_{2min})$ in the skinned group hole machining.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
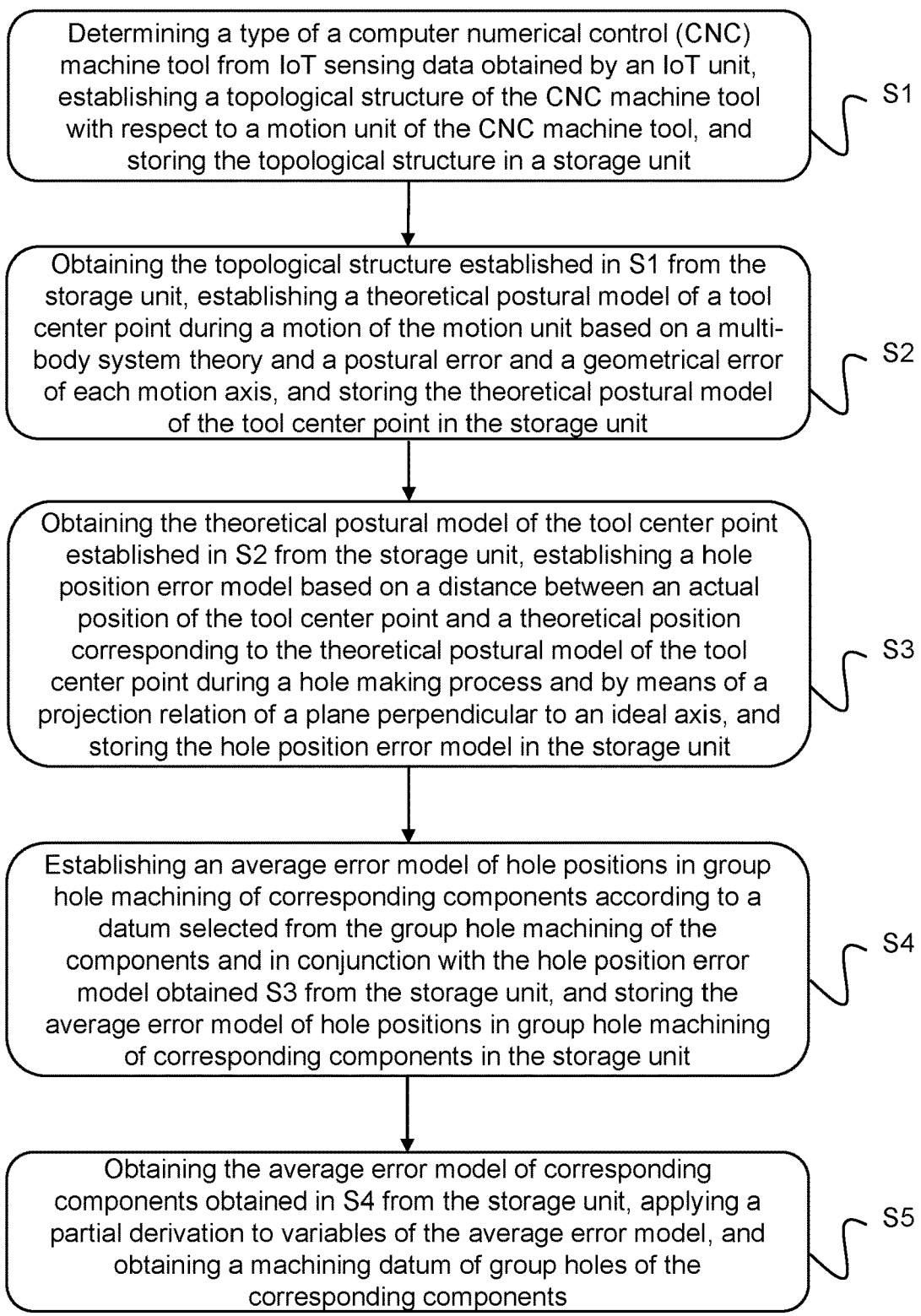
FIG. 1 is a flow chart illustrating an exemplary datum selection method for minimizing hole position errors in group hole machining of large components according to some embodiments of the present disclosure.

In order to more clearly illustrate the technical solutions of the embodiments of the present disclosure, the accompanying drawings to be used in the description of the embodiments will be briefly described below. It will be apparent that the accompanying drawings in the following description are only some examples or embodiments of the present disclosure, and that the present disclosure can be applied to other similar scenarios in accordance with these drawings without creative labor for those of ordinary skill in the art. Unless obviously obtained from the context or the context illustrates otherwise, the same numeral in the drawings refers to the same structure or operation.

It should be understood that "system", "device", "unit" and/or "module" as used herein is a method for distinguishing between different components, elements, parts, sections, or assemblies at different levels. However, the words may be replaced by other expressions if other words would accomplish the same purpose.

As indicated in the present disclosure and in the claims, unless the context clearly suggests an exception, the words "one," "a," "a kind of," and/or "the" do not refer specifically to the singular but may also include the plural. The word "the" does not refer specifically to the singular, but may also include the plural. In general, the terms "including" and "comprising" suggest only the inclusion of clearly identified steps and elements, which do not constitute an exclusive list, and the method or apparatus may also include other steps or elements.

Flowcharts are used in the present disclosure to illustrate operations performed by a system according to embodiments of the present disclosure. It should be understood that the preceding or following operations are not necessarily performed in an exact sequence. Instead, the steps can be processed in reverse order or simultaneously. It is also possible to add other operations to these processes, or to remove a step or steps from them.

Embodiment 1

The present disclosure provides a datum selection method for group hole machining of components, which is executed by a processor, and as shown in FIG. 1, the process includes following steps:

S1, determining a type of a computer numerical control (CNC) machine tool from Internet of Things (IoT) sensing data obtained by an IoT unit, establishing a topological structure of the CNC machine tool with respect to a motion unit of the CNC machine tool, and storing the topological structure in a storage unit.

The type of the CNC machine tool may include a metal cutting CNC machine tool, a special processing CNC machine tool, a plate processing CNC machine tool, a CNC shearing machine, and so on. The topological structure of the CNC machine tool refers to a structural diagram formed by abstracting various motion units of the CNC machine tool into points that are independent of size and shape.

In some embodiments, the topological structure of the CNC machine may be established by topological sorting algorithms such as kahs algorithm, AVO nets, or other feasible manners. In some embodiments, the processor may simplify the topological structure of the CNC machine tool according to a low order body array manner and number a corresponding motion unit with a low order body.

The IoT unit is a unit that may obtain, transmit, and process data related to the CNC machine tool. The IoT unit may include a positioning sensor, an infrared ranging sensor, or the like.

The IoT sensing data is relevant data collected by the IoT unit about the CNC machine tool.

S2, obtaining the topological structure established in step (1) from the storage unit, establishing a theoretical postural model of a tool center point during a motion of the motion unit based on a multi-body system theory and a postural error and a geometrical error of each motion axis, and storing the theoretical postural model of the tool center point in the storage unit.

S3, obtaining the theoretical postural model of the tool center point established in step (2) from the storage unit, establishing a hole position error model based on a distance between an actual position of the tool center point and a theoretical position corresponding to the theoretical postural model of the tool center point during a hole making process and by means of a projection relation of a plane perpendicular to an ideal axis, and storing the hole position error model in the storage unit. In some embodiments, the actual position of the tool center point may be obtained from a positioning sensor displaced on the tool.

S4, establishing an average error model of hole positions in group hole machining of corresponding components according to a datum selected from the group hole machining of the components and in conjunction with the hole position error model obtained in step (3) from the storage unit, and storing the average error model of hole positions in group hole machining of corresponding components in the storage unit.

There are usually two machining forms of the group holes of the components: a skeleton group hole machining form and a skinned group hole machining form. Depending on different machining forms, the way for selecting the datum may be different.

In a selection process of a skeleton group hole machining datum, a principle of selecting a Z coordinate is that: selecting a coordinate value of the Z coordinate for the skeleton group hole machining within a machining range in a Z direction of the group holes.

In the selection process of a skinned group hole machining datum, a principle of selecting the Z coordinate is that: determining the coordinate value of the Z coordinate for the skinned group hole machining by a maximum value in the Z direction of the group holes and a safety distance reserved between the tool center point and the skin. After determining the machining form, by selecting a corresponding datum, the average error model of hole positions in the skeleton group hole machining and the skinned group hole machining is established according to the selected datum and the hole position error model of hole making.

S5, obtaining the average error model of corresponding components obtained in step (4) from the storage unit, applying a partial derivation to variables of the average error model, and obtaining a machining datum of group holes of the corresponding components.

The skeleton group hole machining obtains a datum for minimizing a hole position error in skeleton group hole machining by establishing a Lagrangian function and applying a bias derivation to variables of the average error model of hole positions in the skeleton group hole machining.

The skinned group hole machining obtains a datum for minimizing a hole position error in skinned group hole machining by applying a bias derivation to variables of the average error model of hole positions in the skinned group hole machining.

In some embodiments of the present disclosure, different principles of selecting datums are given for the skeleton group hole machining and the skinned group hole machining of aircraft components respectively, which can effectively improve the positional accuracy of the skeleton group hole machining and the skinned group hole machining, and at the same time provide a more scientific and reasonable approach to select a datum in group hole machining of large components.

In some embodiments of the present disclosure, the datum selection method for minimizing hole position errors in group hole machining of large components is applicable to group hole machining on CNC machine tools with three-axis and above, and can also be used in other CNC machining fields, which is suitable for wide promotion and application.

Embodiment 2

The present disclosure uses a five-axis CNC machine tool of an AC pendulum angle type as an example of datum selection. The five-axis CNC machine tool of an AC pendulum angle type includes following parts: a machine tool bed, an X-axis motion unit, a Y-axis motion unit, a Z-axis motion unit, a C-axis motion unit, and an A-axis motion unit.

The topological structure of the five-axis CNC machine tool is as follows: a machine tool bed 0→an X-axis motion unit 1→a Y-axis motion unit 2→a Z-axis motion unit 3→a C-axis motion unit 4→an A-axis motion unit 5, wherein the C-axis motion unit 4 is pivotally connected to the Z-axis motion unit 3, the A-axis motion unit 5 is pivotally connected to the C-axis motion unit 4, a machining spindle is solidly connected to the A-axis 5, and a tool is placed to be clamped on the machining spindle. In order to facilitate error modeling, a solid-connected motion coordinate system is established for each feed axis, and the solid-connected coordinate system in motion has the same position, and a wrist center O is set at an intersection of a rotation axis of the C-axis and a rotation axis of the A-axis, and a negative direction of the Z-axis is used in this embodiment as a direction of product machining.

In this embodiment, according to a multi-body kinematics theory, a motion state of an arbitrary rigid body in space can be expressed by a transformation relationship of a homogeneous coordinate matrix in a corresponding direction, in which a linear feed axis U and a rotation feed axis V of the machine tool, indicating that an error is a static error. X, Y, and Z indicate a direction of a linear error respectively, α, β, and γ denote a direction of a rotation error around the X, Y, and Z respectively. u denotes a displacement amount of the linear feed axis U and v denotes a rotation amount of the feed axis V. i and j denote a low order body number of a corresponding feed axis in the topological structure of the machine tool and a current feed axis number respectively, then an error transfer matrix corresponding to the linear feed axis U and the rotation feed axis V $E_{Ui}^j(u)$ and $E_{Vi}^j(v)$ may be respectively expressed as:

$$E_{Ui}^j(u) = \delta X_i^j(u)\delta Y_i^j(u)\delta Z_i^j(u)\delta\alpha_i^j(u)\delta\beta_i^j(u)\delta\gamma_i^j(u), \quad (1)$$

and $$E_{Vi}^j(v) = \delta X_i^j(v)\delta Y_i^j(v)\delta Z_i^j(v)\delta\alpha_i^j(v)\delta\beta_i^j(v)\delta\gamma_i^j(v). \quad (2)$$

In equation (1).

$$X_i^j(u) = \begin{bmatrix} 1 & 0 & 0 & \delta X_i^j(u) \\ 0 & 1 & 0 & 0 \\ 0 & 0 & 1 & 0 \\ 0 & 0 & 0 & 1 \end{bmatrix}.$$

$$\delta Y_i^j(u) = \begin{bmatrix} 1 & 0 & 0 & 0 \\ 0 & 1 & 0 & \delta Y_i^j(u) \\ 0 & 0 & 1 & 0 \\ 0 & 0 & 0 & 1 \end{bmatrix}.$$

$$\delta Z_i^j(u) = \begin{bmatrix} 1 & 0 & 0 & 0 \\ 0 & 1 & 0 & 0 \\ 0 & 0 & 1 & \delta Z_i^j(u) \\ 0 & 0 & 0 & 1 \end{bmatrix}.$$

where $\delta X_i^j(u)$, $\delta X_i^j(u)$, and $\delta X_i^j(u)$ denote a linear error of the linear feed axis in a direction of X, Y and Z, respectively.

$$\delta\alpha_i^j(u) = \begin{bmatrix} 1 & 0 & 0 & 0 \\ 0 & \cos(\delta\alpha_i^j(u)) & -\sin(\delta\alpha_i^j(u)) & 0 \\ 0 & \sin(\delta\alpha_i^j(u)) & \cos(\delta\alpha_i^j(u)) & 0 \\ 0 & 0 & 0 & 1 \end{bmatrix}.$$

$$\delta\beta_i^j(u) = \begin{bmatrix} \cos(\delta\beta_i^j(u)) & 0 & \sin(\delta\beta_i^j(u)) & 0 \\ 0 & 1 & 0 & 0 \\ -\sin(\delta\beta_i^j(u)) & 0 & \cos(\delta\beta_i^j(u)) & 0 \\ 0 & 0 & 0 & 1 \end{bmatrix}.$$

$$\delta\gamma_i^j(u) = \begin{bmatrix} \cos(\delta\gamma_i^j(u)) & \sin(\delta\gamma_i^j(u)) & 0 & 0 \\ \sin(\delta\gamma_i^j(u)) & \cos(\delta\gamma_i^j(u)) & 0 & 0 \\ 0 & 0 & 1 & 0 \\ 0 & 0 & 0 & 1 \end{bmatrix}.$$

where $\delta X_i^j(u)$, $\delta\beta_i^j(u)$, and $\delta\gamma_i^j(u)$ denote a rotation error of the linear feed axis around a rotation direction of X, Y and Z, respectively.

In equation (2).

$$\delta X_i^j(v) = \begin{bmatrix} 1 & 0 & 0 & \delta X_i^j(v) \\ 0 & 1 & 0 & 0 \\ 0 & 0 & 1 & 0 \\ 0 & 0 & 0 & 1 \end{bmatrix}.$$

$$\delta Y_i^j(v) = \begin{bmatrix} 1 & 0 & 0 & 0 \\ 0 & 1 & 0 & \delta Y_i^j(v) \\ 0 & 0 & 1 & 0 \\ 0 & 0 & 0 & 1 \end{bmatrix}.$$

$$\delta Z_i^j(v) = \begin{bmatrix} 1 & 0 & 0 & 0 \\ 0 & 1 & 0 & 0 \\ 0 & 0 & 1 & \delta Z_i^j(v) \\ 0 & 0 & 0 & 1 \end{bmatrix}.$$

where $\delta\gamma_i^j(u)$, $\delta\gamma_i^j(u)$, and $\delta\gamma_i^j(u)$ denote a linear error of the rotation feed axis in a direction of X, Y and Z, respectively.

$$\delta\alpha_i^j(v) = \begin{bmatrix} 1 & 0 & 0 & 0 \\ 0 & \cos(\delta\alpha_i^j(v)) & -\sin(\delta\alpha_i^j(v)) & 0 \\ 0 & \sin(\delta\alpha_i^j(v)) & \cos(\delta\alpha_i^j(v)) & 0 \\ 0 & 0 & 0 & 1 \end{bmatrix}.$$

$$\delta\beta_i^j(v) = \begin{bmatrix} \cos(\delta\beta_i^j(v)) & 0 & \sin(\delta\beta_i^j(v)) & 0 \\ 0 & 1 & 0 & 0 \\ -\sin(\delta\beta_i^j(v)) & 0 & \cos(\delta\beta_i^j(v)) & 0 \\ 0 & 0 & 0 & 1 \end{bmatrix}.$$

$$\delta\gamma_i^j(v) = \begin{bmatrix} \cos(\delta\gamma_i^j(v)) & \sin(\delta\gamma_i^j(v)) & 0 & 0 \\ \sin(\delta\gamma_i^j(v)) & \cos(\delta\gamma_i^j(v)) & 0 & 0 \\ 0 & 0 & 1 & 0 \\ 0 & 0 & 0 & 1 \end{bmatrix}.$$

where oaf $\delta\alpha_i^j(v)$, $\delta\beta_i^j(v)$, and $\delta\gamma_i^j(v)$ denote a rotation error of the rotation feed axis around a rotation direction of X, Y and Z, respectively.

Assuming that the distance between a tool center point on the spindle end face and the wrist center O is a sum of a rotation center distance and a length of the tool, expressed as I, then a motion amount of each feed axis is expressed as x, y, z, c, and a respectively. A motion trajectory $P_{ideal}$ of the machine tool in an ideal state is expressed as:

$$P_{ideal} = M_0^1(x)M_1^2(y)M_2^3(z)M_3^4(c)M_4^5(a)P_l \quad (3)$$

An attitude $V_{ideal}$ of the AC pendulum angle in an ideal state is expressed as:

$$V_{ideal} = M_0^1(x)M_1^2(y)M_2^3(z)M_3^4(c)M_4^5(a)V_l \quad (4)$$

The motion matrix of each axis in Equation (3) and (4) is expressed as:

$$M_0^1(x) = \begin{bmatrix} 1 & 0 & 0 & x \\ 0 & 1 & 0 & 0 \\ 0 & 0 & 1 & 0 \\ 0 & 0 & 0 & 1 \end{bmatrix}.$$

$$M_1^2(y) = \begin{bmatrix} 1 & 0 & 0 & 0 \\ 0 & 1 & 0 & y \\ 0 & 0 & 1 & 0 \\ 0 & 0 & 0 & 1 \end{bmatrix}.$$

$$M_2^3(z) = \begin{bmatrix} 1 & 0 & 0 & 0 \\ 0 & 1 & 0 & 0 \\ 0 & 0 & 1 & z \\ 0 & 0 & 0 & 1 \end{bmatrix}.$$

-continued $$M_3^4(c) = \begin{bmatrix} \cos(c) & -\sin(c) & 0 & 0 \\ \sin(c) & \cos(c) & 0 & 0 \\ 0 & 0 & 1 & 0 \\ 0 & 0 & 0 & 1 \end{bmatrix}.$$

$$M_4^5(a) = \begin{bmatrix} 1 & 0 & 0 & 0 \\ 0 & \cos(a) & -\sin(a) & 0 \\ 0 & \sin(a) & \cos(a) & 0 \\ 0 & 0 & 0 & 1 \end{bmatrix}.$$

$$P_l = \begin{bmatrix} 0 \\ 0 \\ -l \\ 1 \end{bmatrix}$$

denotes a homogeneous coordinate of a tool tip in a spindle coordinate system, and $$V_l = \begin{bmatrix} 0 \\ 0 \\ -1 \\ 1 \end{bmatrix}$$

denotes a homogeneous coordinate of a tool axis in the spindle coordinate system.

In the actual working situation, in the process for group hole machining of components, the motion trajectory is expressed through the form of points, a motion of the feed axis of the machine tool feed may be seen as only affected by the static error, and an actual motion trajectory of the tool center point of the machine tool is a combined result of an ideal motion and the error. Then an equation for the motion trajectory $P_{actual}$ of the tool center point of the machine tool in an actual condition is:

$$P_{actual} = M_0^1(x)E_0^1(x)M_1^2(y)E_1^2(y)M_2^3(z)E_2^3(z)M_3^4(c) \\ E_3^4(c)M_4^5(a)E_4^5(a)P_l \quad (5)$$

where $E_0^1(x)$, $E_1^2(y)$ and $E_2^3(z)$ are calculated from equation (1), and $E_3^4(c)$ and $E_4^5(a)$ are calculated from equation (2).

$E_1^0(x)$ denotes an integrated error matrix composed of an X-axis positioning error, a linear pair error, and a swing, yaw and roll error, $E_1^2(y)$ denotes an integrated error matrix composed of a Y-axis positioning error, a linear pair error, and a swing, yaw and roll error, $E_2^3(z)$ denotes an integrated error matrix composed of a Z-axis positioning error, a linear pair error, and a swing, yaw, and roll error, $E_3^4(c)$ denotes an integrated error matrix composed of a C-axis positioning error, a linear pair error, and a swing, yaw, and roll error, and $E_4^5(a)$ denotes an integrated error matrix composed of an A-axis positioning error, a linear pair error, and a swing, yaw, and roll error. Then a deviation $P_{error}$ of an actual motion trajectory of the tool center point from an ideal motion trajectory is as follows:

$$P_{error} = P_{actual} - P_{ideal} = [P_{error\_x} P_{error\_y} P_{error\_z} 0]^T \quad (6)$$

Figure 3:
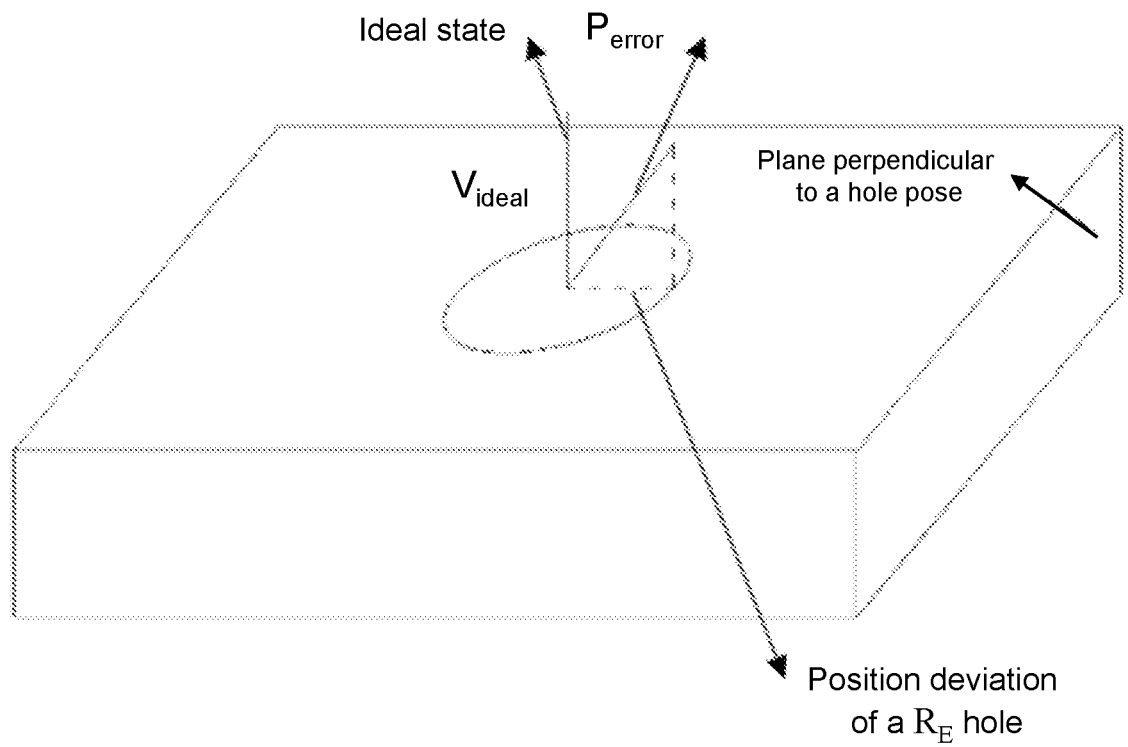
FIG. 3 is a schematic diagram illustrating an exemplary position error during hole making according to some embodiments of the present disclosure.

Based on a projection of a position error during the hole making process on a plane perpendicular to an ideal axis, as shown in FIG. 3, a position deviation $P_{error\_V}$ on a camber for hole making may be calculated as follows:

$$P_{error\_V} = (I_4 - V_{ideal}V_{ideal}^T)P_{error} \quad (7)$$

where $(I_4 - V_{ideal}V_{ideal}^T)$ denotes an operator of a projection transformation.

Then a hole position error $R_E$ for hole making of this machine tool may be expressed as:

$$R_E = |P_{error\_V}| \quad (8)$$

Figure 4:
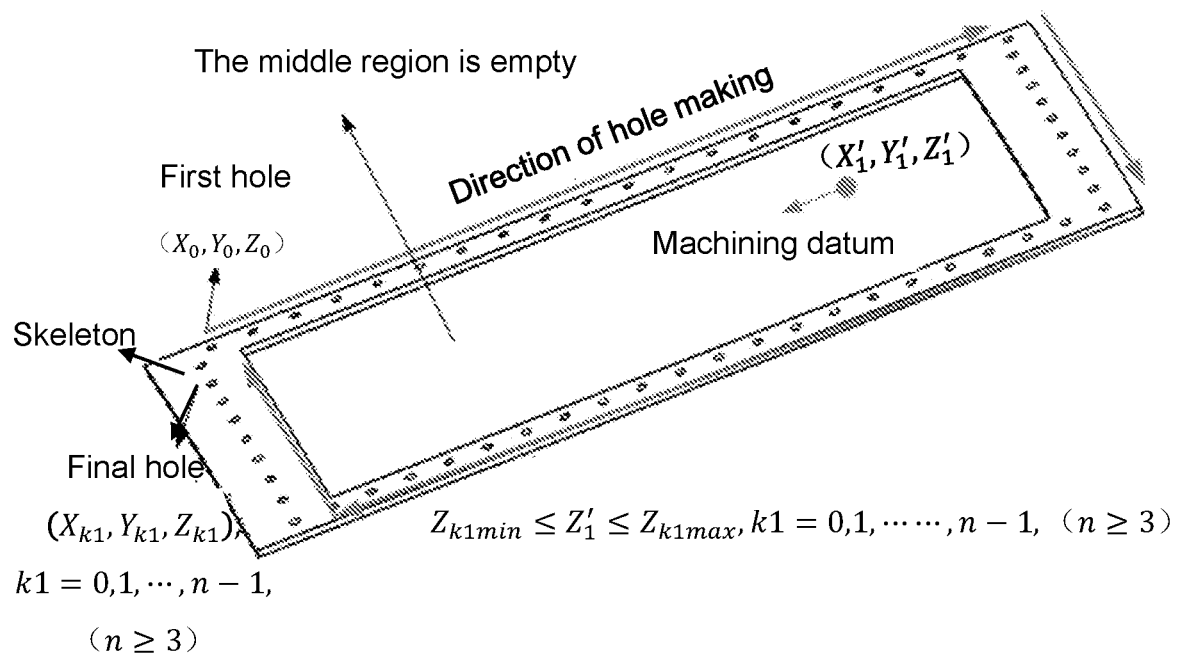
FIG. 4 is a schematic diagram illustrating an exemplary skeleton group hole machining datum model according to some embodiments of the present disclosure.
Figure 5:
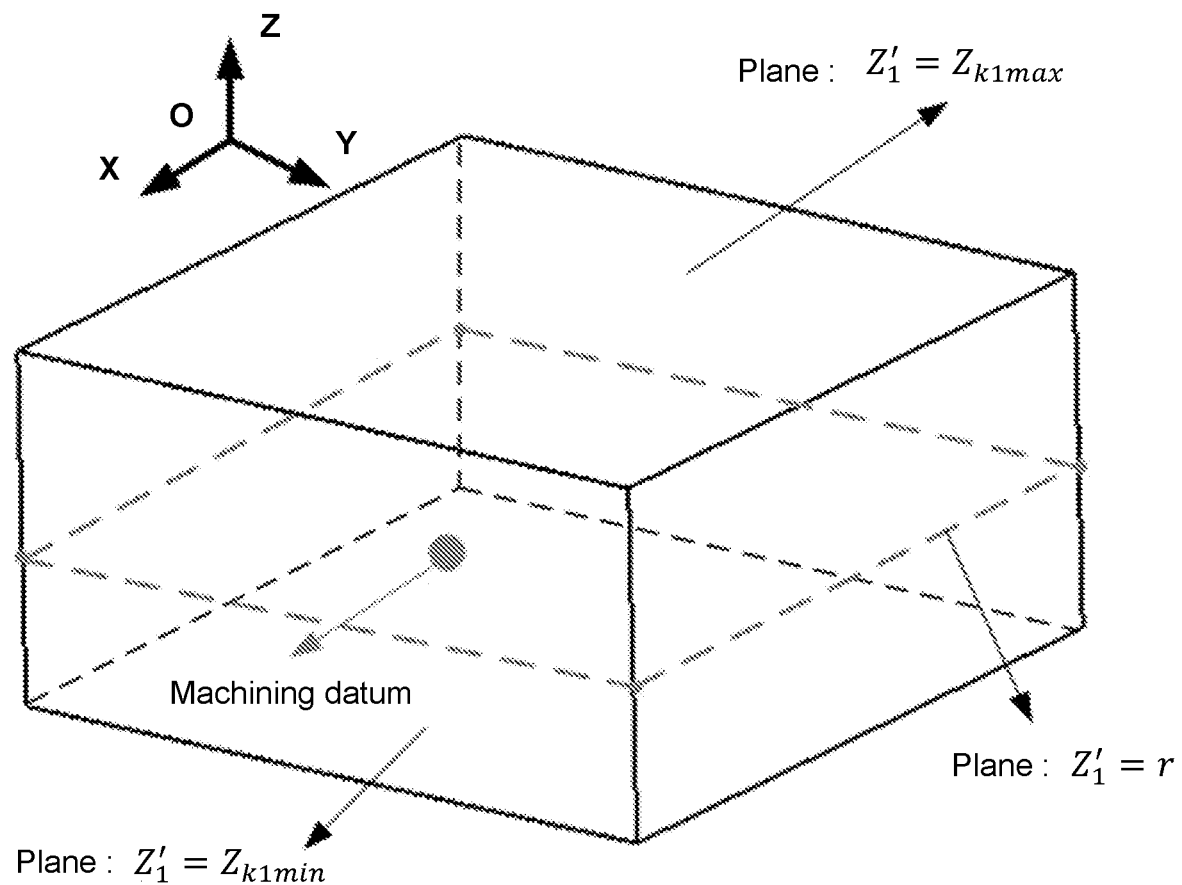
FIG. 5 is a schematic diagram illustrating an exemplary selection of a datum for minimizing a hole position error in skeleton group hole machining according to some embodiments of the present disclosure.

Due to the different types of group hole machining, a skeleton group hole machining datum model is first established as shown in FIG. 4:

According to the CNC machine tool precision detection and compensation principles, the farther away from the verification origin point of the machine tool, the worse the accuracy indicators such as the positioning accuracy and straightness of the machine tool. Usually, during a skeleton group hole machining process, an open area of a skeleton is relatively large, and there is a difference in a machining position of the group holes in a direction of the Z-axis, i.e., the group holes are not necessarily on a same Z-plane. Then the datum for skeleton group hole machining may be selected in a middle open area of the skeleton and between a plane determined by a smallest coordinate value $Z_{k1min}$ of a Z-axis and a plane determined by a largest coordinate value $Z_{k1max}$ of the Z-axis in the machining position of the group holes, as shown in FIG. 5.

Therefore, it is assumed that a datum selected in this area during the skeleton group hole machining process is $(X'_1, Y'_1, Z'_1)$.

A position coordinate of the skeleton group hole machining is:

$$(X_{k1}, Y_{k1}, Z_{k1}), k1=0,1, \ldots, n-1, (n \geq 3).$$

where k1 denotes a natural number, n denotes a positive integer, and a range of the skeleton group hole machining along the direction of the Z-axis is:

$$Z'_1 = Z_{k1min} \leq Z'_1 \leq Z'_1 = Z_{k1max}, k1=0,1, \ldots, n-1, \\ (n \geq 3)$$

The datum for skeleton group hole machining necessarily falls in a plane in a range along the direction of the Z-axis, and r denotes a constant, so that the plane may be assumed to be:

$$Z'_1 = r, Z_{k1min} \leq r \leq Z_{k1max} \quad (9)$$

where a relative positional relationship of a motion of the tool center point during the machining is $x_{k1}$, $y_{k1}$, and $z_{k1}$, where:

$$x_{k1} = X'_1 - X_{k1} \quad (10)$$

$$y_{k1} = Y'_1 - Y_{k1} \quad (11)$$

$$z_{k1} = Z'_1 - Z_{k1} \quad (12)$$

According to equations (6), (7), and (8), a hole position error $R_{Ek}$ generated during the skeleton group hole machining is as follows:

$$P_{errork1} = P_{actualk1} - P_{idealk1} \quad (13)$$

$$P_{error\_Vk1} = (I_4 - V_{idealk1}V_{idealk1}^T)P_{errork1} \quad (14)$$

$$R_{Ek1} = |P_{error\_Vk1}| \quad (15)$$

According to equations (13), (14), and (15), an expression for an average error $P_{error\_Ek1}$ generated during the skeleton group hole machining is as follows:

$$P_{error\_Ek1}(X'_1, Y'_1, Z'_1) = \frac{\sum_{k=0}^{n-1} R_{Ek1}}{n}, k1 = 0, 1, \ldots, n-1, (n \geq 3) \quad (16)$$

where $R_{Ek}$ denotes a hole position error of a single hole and n denotes a positive integer.

According to equation (9), the Lagrangian function is set as:

$$L(X'_1, Y'_1, Z'_1, \lambda) = P_{error\_Ek1}(X'_1, Y'_1, Z'_1) + \lambda(Z'_1 - r) \quad (17)$$

Taking partial derivatives of the equation (17) and making them all equal to zero, then an equation is obtained as:

$$\begin{cases} \dfrac{\partial L(X'_1, Y'_1, Z'_1, \lambda)}{\partial X'_1} = 0 \\ \dfrac{\partial L(X'_1, Y'_1, Z'_1, \lambda)}{\partial Y'_1} = 0 \\ \dfrac{\partial L(X'_1, Y'_1, Z'_1, \lambda)}{\partial Z'_1} = 0 \\ \dfrac{\partial L(X'_1, Y'_1, Z'_1, \lambda)}{\partial \lambda} = 0 \end{cases}$$

A minimum value of $L(X'_1, Y'_1, Z'_1, \lambda)$ is obtaining and designated as a datum coordinate $(X'_{1min}, Y'_{1min}, Z'_{1min})$ for minimizing a hole position error in skeleton group hole machining.

Figure 6:
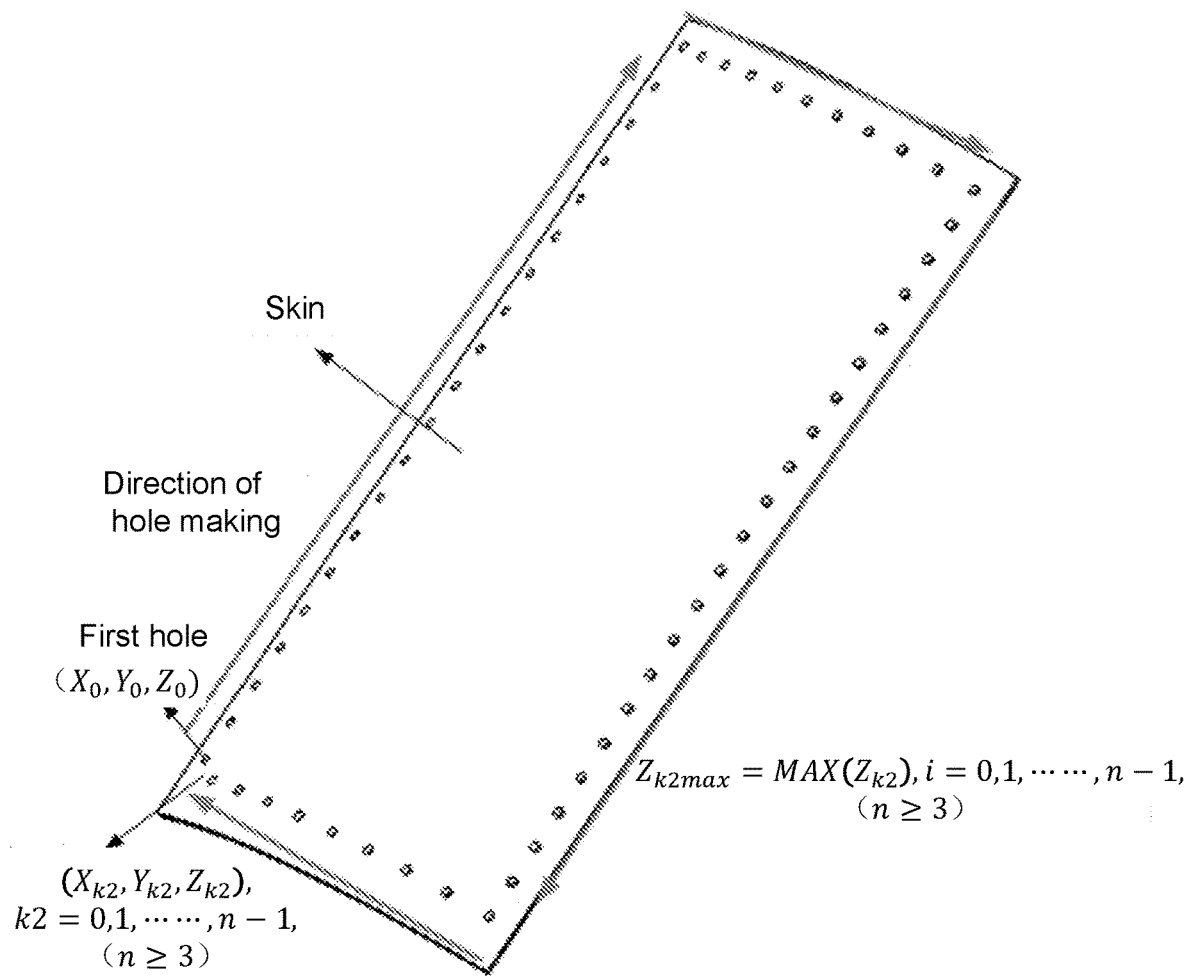
FIG. 6 is a schematic diagram illustrating an exemplary skinned group hole machining datum model according to some embodiments of the present disclosure.
Figure 7:
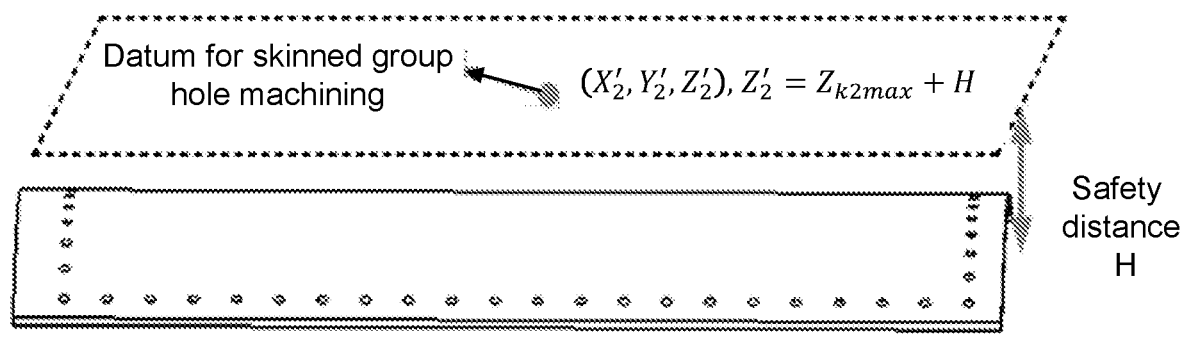
FIG. 7 is a schematic diagram illustrating an exemplary selection of a datum for minimizing a hole position error in skinned group hole machining according to some embodiments of the present disclosure.

Next, a skinned group hole machining datum model is established as shown in FIGS. 6 and 7:

It is assumed that a datum coordinate of skinned group hole machining is: $(X'_2, Y'_2, Z'_2)$.

In order to ensure the machining safety during the skinned machining process and to prevent the tool from colliding with the skin, according to a position coordinate $(X_{k2}, Y_{k2}, Z_{k2})$ of the skinned group hole machining (where k2=0, 1, ..., n−1, (n≥3) and n denotes a positive integer), a maximum value of $Z_k$, is selected, i.e., $Z_{k2max}=\text{MAX}(Z_{k2})$, i=0, 1, ......, n−1, (n≥3).

A safety distance between the skin and the tool center point is set as H, then a plane where the tool center point is located is selected by the datum for skinned group hole machining as follows:

$$Z'_2 = Z_{k2max} + H \quad (18)$$

A relative positional relationship of the motion of the tool center point during machining is as $x_{k2}$, $y_{k2}$, and $z_{k2}$, where:

$$x_{k2} = X'_2 - X_{k2} \quad (19)$$

$$y_{k2} = Y'_2 - Y_{k2} \quad (20)$$

$$z_{k2} = Z'_2 - Z_{k2} \quad (21)$$

According to equations (6), (7), and (8), then a hole position error $R_{Ek2}$ generated during the skinned group hole machining is as follows:

$$P_{errork2} = P_{actualk2} - P_{idealk2} \quad (22)$$

$$P_{error\_Vk2} = (I_4 - V_{idealk2}V_{idealk2}^T)P_{errork2} \quad (23)$$

$$R_{Ek2} = |P_{error\_Vk2}| \quad (24)$$

According to equations (22), (23), and (24), then an expression for an average error generated during the skinned group hole machining is:

$$P_{error\_Ek2}(X'_2, Y'_2, Z'_2) = \dfrac{\sum_{k=0}^{n-1} R_{Ek2}}{n}, \quad (25)$$

where $R_{Ek2}$ denotes a hole position error of a single hole).

The datum for the group hole machining is selected in a plane $Z'_2$, where $Z'_2 = Z_{k2max} + H$ and the safety distance between the skin and the tool center point is H. Taking partial derivatives of the function $P_{error\_Ek2}(X'_2, Y'_2, Z'_2)$ and making them equal to zero, and taking an extreme value, then an equation is obtained as:

$$\begin{cases} \dfrac{\partial L(X'_2, Y'_2, Z_{k2max} + H)}{\partial X'_2} = 0 \\ \dfrac{\partial L(X'_2, Y'_2, Z_{k2max} + H)}{\partial Y'_2} = 0 \end{cases}.$$

A minimum value $P_{error_{Ek2}}(X'_2, Y'_2, Z'_2)$ is obtained and designated as a datum coordinate for minimizing a hole position error in skinned group hole machining $(X'_{2min}, Y'_{2min}, Z'_{2min})$.

In some embodiments of the present disclosure, it is more scientific and reasonable to derive the datum for minimizing a hole position error by calculating an average value of a hole position error between a point in space and the group holes; adopting a datum selection method for minimizing hole position errors can effectively improve the positional accuracy of the group hole machining.

In some embodiments, in response to a determination that a machining form of the group holes of the components is a skeleton group hole machining form, the skeleton group hole machining datum is determined by: determining a probabilistically safe feasible domain by an anomaly rate prediction model based on a type of the CNC machine tool, a topological structure of the CNC machine tool, a motion feature of each motion unit in the topological structure, a group hole distribution feature, and a set of candidate points.

The anomaly rate prediction model is a machine learning model such as a Neural Network (NN) model.

Figure 8:
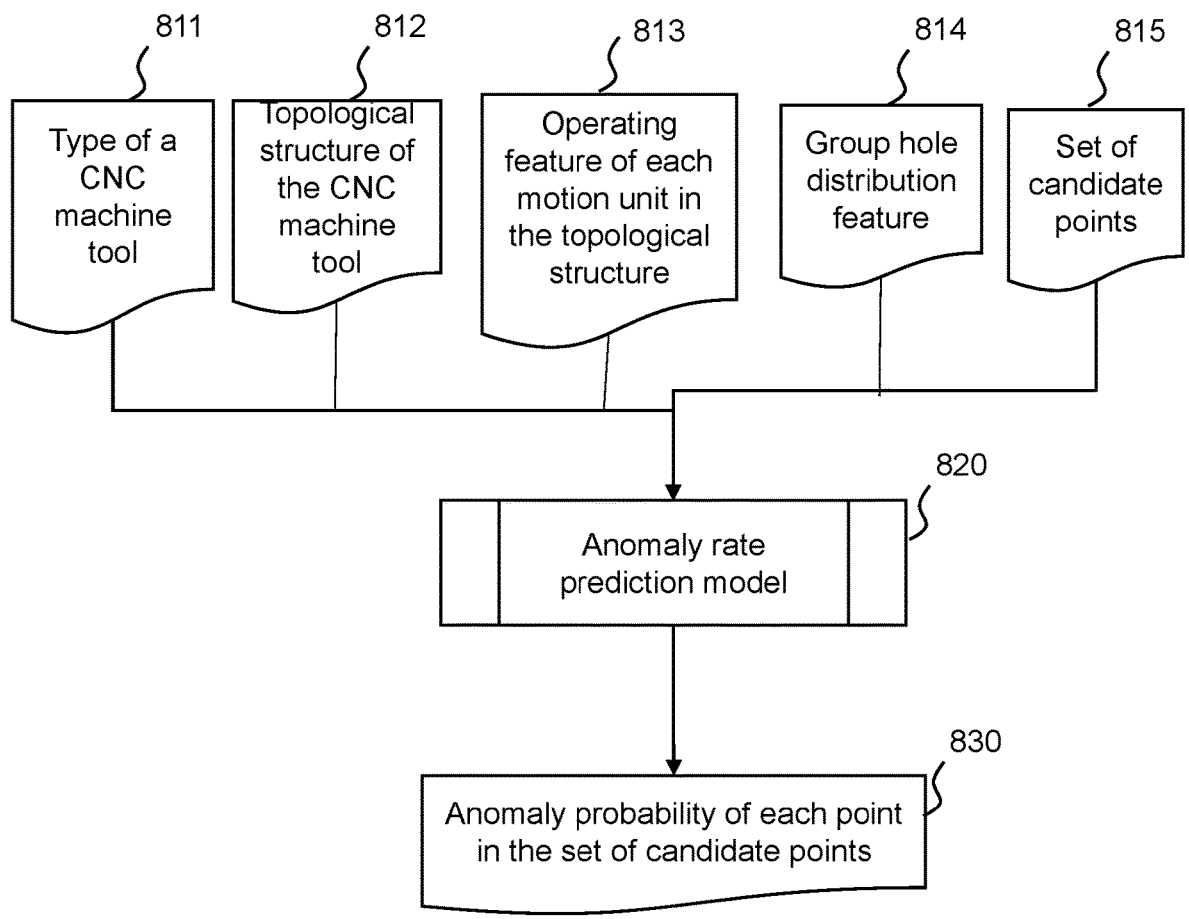
FIG. 8 is a schematic illustrating an exemplary anomaly rate prediction model according to some embodiments of the present disclosure.

As shown in FIG. 8, an input of the anomaly rate prediction model 820 is a type of the CNC machine tool 811, a topological structure of the CNC machine tool 812, an operating feature of each motion unit in the topological structure 813, a group hole distribution feature 814, and a set of candidate points 815, and an output is an anomaly probability of each point in the set of candidate points 830.

Figure 2:
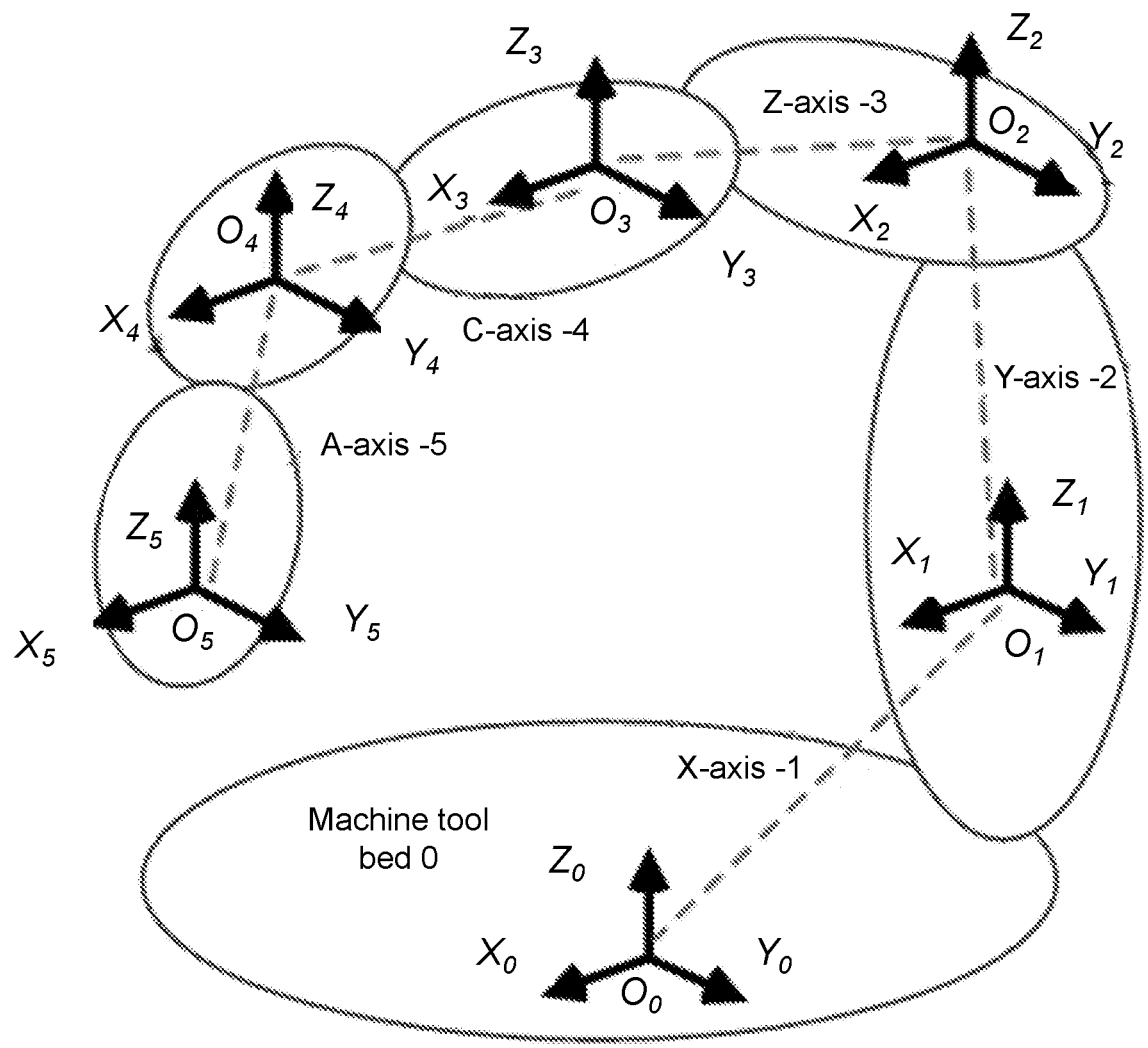
FIG. 2 is a schematic diagram illustrating an exemplary topological structure of a five-axis computer numerical control (CNC) machine tool according to some embodiments of the present disclosure.

Please see FIG. 1 and FIG. 2 and their associated descriptions for more on the topological structure of the CNC machine tool.

The operating feature of each motion unit in the topological structure 813 is a feature related to an operation of each motion unit in the topological structure, for example, a count of years of operation, a length of continuous operation (a time distance between a moment of the most recent power-on and a current moment), and a lubricant replenishment interval (a time interval between a moment of the most recent lubricant replenishment and the current moment).

The group hole distribution feature 814 is a feature that relates to a property and distribution of the group holes themselves, for example, a hole diameter, a hole depth, 3D position coordinates, or the like.

The set of candidate points 815 is a collection of points that satisfy a constraint used as an alternative as the datum point (a point corresponding to a datum coordinate), and each point in the set may be represented by a three-dimensional coordinate. The constraint includes the point being located in a middle open area of the skeleton and below a first plane and above a second plane. The first plane is a plane determined by a smallest value $Z_{k1min}$ of the Z-axis coordinate in the group hole machining position, and the second plane is a plane determined by a largest value $Z_{k1max}$ of the Z-axis coordinate in the group hole machining position, i.e., for a Z-coordinate of any point in the set of candidate points, there is a relationship as $Z_{k1min} \leq Z \leq Z_{k1max}$. For the middle open area of the skeleton and the value of the Z-axis coordinate in the group hole machining position, please see the relevant descriptions in FIGS. 4-5.

The anomaly probability of each point in the set of candidate points 830 is a probability of a machining anomaly or machine failure during subsequent group hole machining after using that point as the datum point.

The processor may obtain the anomaly rate prediction model based on training a large number of first training samples with a first label, and the first training sample and the first label may be obtained from a historical sample.

The first training sample includes a type of a sample CNC machine tool, a topological structure of the sample CNC machine tool, an operating feature of each motion unit in the sample topological structure, a sample group hole distribution feature, and a sample set of candidate points.

In some embodiments, the first label includes 1 and 0. In some embodiments, a manner of labeling the first label includes: for a historical sample in which an anomaly occurs, labeling a label of a coordinate corresponding to a datum point in the sample set of candidate points of the historical sample as 1, and a coordinate corresponding to a non-datum point as 0; and for a historical sample in which the anomaly does not occur, labeling a label of a coordinate corresponding to all points in the sample set of candidate points of the historical sample as 0.

In some embodiments, the first label further includes a label value within a range between (0, 1).

In some embodiments, the manner of labeling the first label further includes: differentially labeling datum points and non-datum points in the sample set of candidate points of the historical sample in which the anomaly occurs. The differentially labeling includes: labeling a label of a coordinate corresponding to the datum point in the sample set of candidate points of the historical sample as 1; and for a coordinate corresponding to the non-datum point in the sample set of candidate points of the historical sample, determining a label value of the coordinate based on a distance of the coordinate from the datum point.

For example, the processor may mathematically calculate the label value based on a distance of the non-datum point from the datum point. Exemplarily, a label value a of a point A may be calculated by a following equation:

$$a = 1 - \frac{d_a}{d_{max}},$$

where $d_a$ denotes a distance between the point A and the datum point, and $d_{max}$ denotes a distance between a farthest point from the datum point in the sample set of candidate points.

During training, the type of the sample CNC machine tool, the topological structure of the sample CNC machine tool, the operating feature of each motion unit in the sample topological structure, the sample group hole distribution feature, and the sample set of candidate points are inputted into an initial anomaly rate prediction model to obtain a prediction result. A loss function is constructed based on the first label and the prediction result, parameters of the anomaly rate prediction model are updated, and a trained anomaly rate prediction model is obtained through parameter updating.

In some embodiments of the present disclosure, by combining a distance between the coordinate corresponding to the non-datum point and the datum point in the sample set of candidate points of the historical sample, a label value determined can be made more accurate, thereby improving the training efficiency of the prediction model and optimizing the training effect of the anomaly rate prediction model.

The probabilistically safe feasible domain is a collection of points whose anomaly probability is below a preset probability threshold. In some embodiments, the processor determines an anomaly probability of each point in the set of candidate points through the anomaly rate prediction model, and then judges the anomaly probability of each point in comparison with the preset probability threshold, and treats an area consisting of points therein whose anomaly probability is below the preset probability threshold as the probabilistically safe feasible domain.

In some embodiments, the processor determines a datum coordinate for minimizing a hole position error in the skeleton group hole machining by establishing a Lagrangian function and obtains a partial derivation of variables of the Lagrangian function in the probabilistically safe feasible domain, and more relevant descriptions can be found in a corresponding previous section.

In some embodiments, the preset probability threshold is associated with an average error. The average error is determined by: taking a plurality of random points from the set of candidate points, calculating an error of each point of the plurality of points, and performing an averaging operation based on the errors of the plurality of points to determine the average error. The larger the average error, the smaller the preset probability threshold may be.

In some embodiments, within the probabilistically safe feasible domain, the processor may determine a coordinate corresponding to a point where the hole position error in the skeleton group hole machining hole position error satisfies a preset condition as the datum coordinate.

The preset condition is that the skeleton group hole machining has a minimum hole position error. When there is a plurality of points that has the minimum hole position error in the skeleton group hole machining at the same time, the processor may select one according to a production need.

In some embodiments, an illustration of the average error generated in the skeleton group hole machining can be referred to in connection with Embodiment 2.

In some embodiments of the present disclosure, by combining the preset probability threshold obtained through calculating the average error of the plurality of points, a determined preset probability threshold can be made more reasonable and more in line with an actual production need.

Understandably, a point with a smallest theoretical error does not mean that it is an optimal point. Error and failure cannot be equated, and a point with a smallest error does not necessarily also has a lowest incidence of failure, e.g., a failure may be related to the machine tool, the skeleton, the group holes, a position selected for the datum, etc., and should not be related only to the error of each point. In some embodiments, the probabilistically safe feasible domain is first screened out by the anomaly rate prediction model, and the points in the probabilistically safe feasible domain all have a low probability of failure; in the probabilistically safe feasible domain, a final datum coordinate is determined by establishing the Lagrangian function and obtaining a partial derivation of variables of the Lagrangian function; so as to realize a more intelligent, precise, and appropriate prediction of the datum coordinate.

In some embodiments, in response to a determination that the machining form of the group holes of the components is a skinned group hole machining form, a safety distance is determined by: determining the safety distance through a safety distance determination model based on a position coordinate of the skinned group hole machining.

The safety distance is a distance reserved between the tool center point and the skin so that machining may be safely carried out.

In some embodiments, an input of the safety distance determination model may be the position coordinate ($X_{k2}$, $Y_{k2}$, $Z_{k2}$) of the skinned group hole machining and an output may be a safety distance H. More relevant embodiments regarding the position coordinate ($X_{k2}$, $Y_{k2}$, $Z_{k2}$) of the skinned group hole machining and the safety distance H can be found in Embodiment 2 and its related contents.

The safety distance determination model is a machine learning model. For example, a type of the safety distance determination model may include a neural network (NN) model or the like.

In some embodiments, the processor may obtain the safety distance determination model by training based on a large number of second training samples with a second label. The second training sample and the second label may be obtained from a historical sample. In some embodiments, the second training sample is a pre-screened historical sample that has no abnormality or the number of abnormalities is less than a preset value. The second training sample may be a position coordinate of a sample skinned group hole machining. The second label may be a safety distance corresponding to the second training sample.

The processor inputs the second training sample with the second label into an initial safety distance determination model, constructs a loss function based on an obtained safety distance and the second label, and iteratively updates parameters of the initial safety distance determination model based on the loss function. When the initial safety distance determination model satisfies a preset condition, the training ends, and the trained safety distance determination model is obtained. The preset condition includes the convergence of the loss function, a count of iterations reaching a threshold, etc.

In some embodiments of the present disclosure, the safety distance is determined based on the safety distance determination model obtained by learning from a large amount of historical data, so that the obtained safety distance is more reliable.

Although some embodiments of the present disclosure have been shown and described, it can be understood by those of ordinary skill in the art that a variety of changes, modifications, substitutions, and variations of some embodiments of the present disclosure can be made without departing from the principles and purposes of the present disclosure, and that the scope of some embodiments of the present disclosure is limited by the claims and their equivalents.

The basic concepts have been described above, and it will be apparent to those skilled in the art that the foregoing detailed disclosure is intended as an example only and does not constitute a limitation of the present disclosure. Although not expressly stated herein, a person skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

Also, the present disclosure uses specific words to describe embodiments of the present disclosure. For example, "an embodiment", "one embodiment", and/or "some embodiments" means a feature, structure, or characteristic associated with at least one embodiment of the present disclosure. Accordingly, it should be emphasized and noted that "an embodiment" or "one embodiment" or "a certain embodiment" referred to two or more times in different places in the present disclosure do not necessarily refer to the same embodiment. In addition, certain features, structures, or characteristics of one or more embodiments of the present disclosure may be suitably combined.

Furthermore, unless expressly stated in the claims, the order of processing elements and sequences, the use of numerical letters, or the use of other names described herein are not intended to limit the order of the processes and methods of the present disclosure. While some embodiments of the invention currently considered useful are discussed in the above disclosure by way of various examples, it should be understood that such details serve only illustrative purposes and that the additional claims are not limited to the disclosed embodiments, but rather the claims are intended to cover all amendments and equivalent combinations that are consistent with the substance and scope of the embodiments of the present disclosure. For example, although the implementation of various components described above may be embodied in a hardware device, it may also be implemented as a software only solution, e.g., an installation on an existing server or mobile device.

Similarly, it should be noted that in order to simplify the presentation of the disclosure of the present disclosure, and thereby aid in the understanding of one or more embodiments of the present disclosure, the preceding description of embodiments of the present disclosure sometimes incorporates a variety of features into a single embodiment, accompanying drawings, or description thereof. However, this method of disclosure does not imply that the object of the present disclosure requires more features than those mentioned in the claims. Rather, claimed subject matter may lie in less than all features of a single foregoing disclosed embodiment.

Some embodiments use numbers to describe the number of components, attributes, and it should be understood that such numbers used in the description of the embodiments are modified in some examples by the modifiers "about", "approximately", or "generally". Unless otherwise stated, "about", "approximately" or "generally" indicates that a variation of ±20% is permitted. Accordingly, in some embodiments, numerical parameters used in the present disclosure and claims are approximations, which can change depending on the desired characteristics of the individual embodiment. In some embodiments, the numerical parameter should take into account a specified number of valid digits and use a general place-keeping method. Although the numerical domains and parameters used to confirm the breadth of their ranges in some embodiments of the present disclosure are approximations, in specific embodiments, such values are set as precisely as possible within the feasible range.

With respect to each patent, patent application, patent application disclosure, and other material, such as articles, books, manuals, publications, documents, etc., cited in the present disclosure, the entire contents thereof are hereby incorporated herein by reference. Historical application documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and those described in the present disclosure, the descriptions, definitions, and/or use of terminology in the present disclosure shall prevail.

Finally, it should be understood that the embodiments described in the present disclosure are intended only to illustrate the principles of the embodiments of the present disclosure. Other deformations may also fall within the scope of the present disclosure. Thus, by way of example and not limitation, alternative configurations of embodiments of the present disclosure may be considered consistent with the teachings of the present disclosure. Accordingly, the embodiments of the present disclosure are not limited to the embodiments expressly presented and described herein.

What is claimed is:

1. A datum selection method for minimizing hole position errors in group hole machining of large components, comprising:
    (1) determining a type of a computer numerical control (CNC) machine tool, and establishing a topological structure of the CNC machine tool with respect to a motion unit of the CNC machine tool;
    (2) establishing a theoretical postural model of a tool center point during a motion of the motion unit of the CNC machine tool according to the topological structure established in step (1);
    (3) according to the theoretical postural model in step (2), establishing a hole position error model based on a distance between an actual position of the tool center point and a theoretical position in the theoretical postural model of the tool center point during a hole making process and by means of a projection relation of a plane perpendicular to an ideal axis;
    (4) establishing an average error model of hole positions according to a datum selected from a machining form of group holes of components and in conjunction with the hole position error model obtained in step (3); and
    (5) obtaining the average error model obtained in step (4), applying a partial derivation to variables of the average error model, and obtaining a machining datum of group holes of the corresponding components.

2. The datum selection method according to claim 1, wherein in the step (1), the establishing a topological structure of the CNC machine tool with respect to a motion unit of the CNC machine tool includes: simplifying the topological structure of the CNC machine tool according to a low order body array manner and numbering the motion unit with a low order body.

3. The datum selection method according to claim 2, wherein in the step (1), the type of the CNC machine tool includes a five-axis CNC machine tool of an AC pendulum angle type, and the five-axis CNC machine tool includes a machine tool bed, an X-axis motion unit, a Y-axis motion unit, a Z-axis motion unit, a C-axis motion unit, and an A-axis motion unit; and
    the topological structure of the CNC machine tool is as follows: the machine tool bed→the X-axis motion unit→the Y-axis motion unit→the Z-axis motion unit-→the C-axis motion unit→the A-axis motion unit, wherein the C-axis motion unit is pivotally connected to the Z-axis motion unit, the A-axis motion unit is pivotally connected to the C-axis motion unit, a machining spindle is solidly connected to the A-axis, and a tool is placed to be clamped on the machining spindle.

4. The datum selection method according to claim 1, wherein in the step (2), the establishing a theoretical postural model of a tool center point during a motion includes: establishing the theoretical postural model of the tool center point based on a multi-body system theory and a postural error and a geometrical error of each motion axis.

5. The datum selection method according to claim 1, wherein the establishing a hole position error model in the step (3) includes: constructing the hole position error model based on the distance between the actual position and the theoretical position of the tool center point during the hole making process and through the projection relation of the plane perpendicular to the ideal axis.

6. The datum selection method according to claim 1, wherein in the step (4), the establishing an average error model of hole positions in group hole machining of corresponding components includes:
    (4.1) determining a machining form of the group holes of the components;
    (4.2) selecting a corresponding datum according to the determined machining form of the group holes of the components; and
    (4.3) establishing the average error model based on the selected datum and the hole position error model during the hole making process.

7. The datum selection method according to claim 6, wherein in the step (4.1), the machining form of the group holes of the components includes a skeleton group hole machining form and a skinned group hole machining form.

8. The datum selection method according to claim 7, wherein in the step (4.2), the selecting a corresponding datum includes: selecting an origin coordinate value upwardly of a group hole machining product;
    wherein a principle of selecting a skeleton group hole machining datum includes: selecting an origin coordinate value for skeleton group hole machining within a range in a direction of the group hole machining product; and
    a principle of selecting a skinned group hole machining datum includes: determining an origin coordinate value for skinned group hole machining through a maximum value of the direction of the group hole machining product and a safety distance reserved between the tool center point and the skin.

9. The datum selection method according to claim 7, wherein in the step (5), the group holes of the corresponding components are skeleton group holes, and the obtaining a machining datum of group holes of the corresponding components includes: obtaining a datum for minimizing a hole position error in skeleton group hole machining by establishing a Lagrangian function and obtaining a partial derivation of variables of the Lagrangian function.

10. The datum selection method according to claim 7, wherein the group holes of the corresponding components are skinned group holes, and the obtaining a machining datum of group holes of the corresponding components includes: obtaining a datum for minimizing a hole position error in skinned group hole machining by applying a bias derivation to variables of an average error model of hole positions in the skinned group hole machining.

* * * * *